J. CLAYTON.
TAKE-UP MECHANISM FOR WINDING DEVICES.
APPLICATION FILED APR. 24, 1920.
1,398,680.
Patented Nov. 29, 1921.
2 SHEETS—SHEET 1.
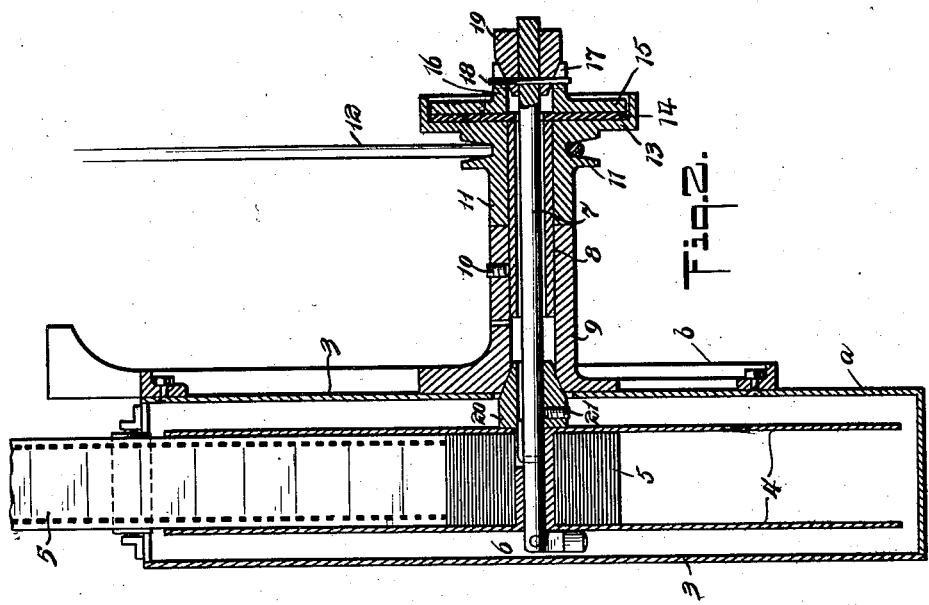
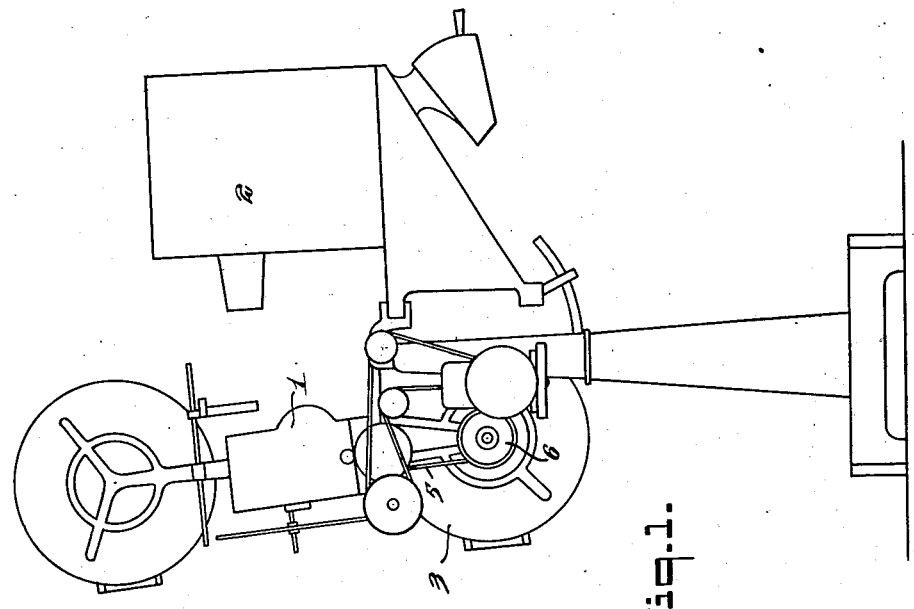
WITNESSES:
INVENTOR
ATTORNEYS J. CLAYTON.
TAKE-UP MECHANISM FOR WINDING DEVICES.
APPLICATION FILED APR. 24, 1920.
1,398,680.
Patented Nov. 29, 1921.
2 SHEETS—SHEET 2.
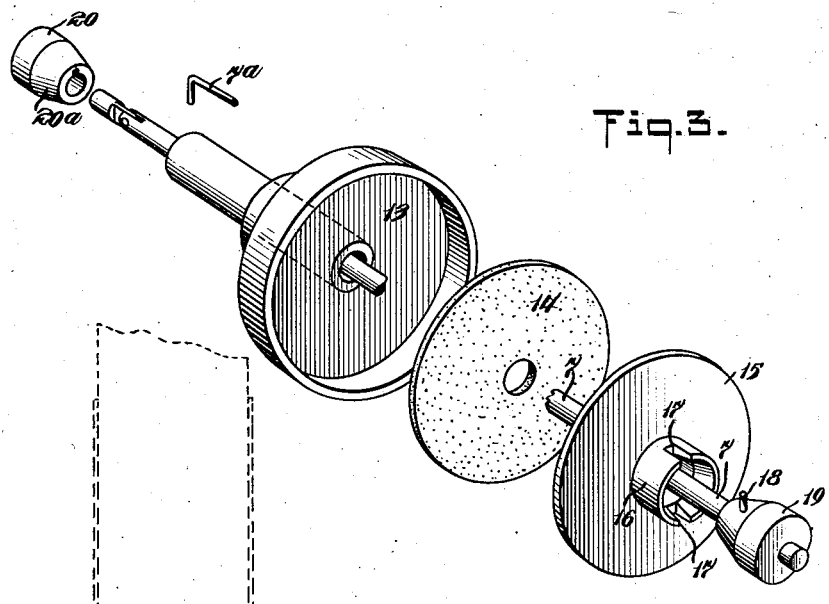
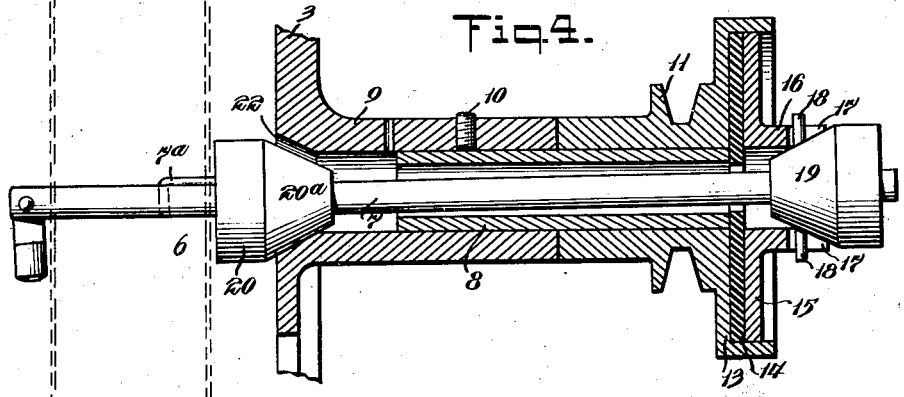
WITNESSES:
INVENTOR
Joseph Clayton
BY
ATTORNEYS

UNITED STATES PATENT OFFICE.

JOSEPH CLAYTON, OF NEW YORK, N. Y.

TAKE-UP MECHANISM FOR WINDING DEVICES.

1,398,680.   Specification of Letters Patent.   Patented Nov. 29, 1921.

Application filed April 24, 1920. Serial No. 376,253.

*To all whom it may concern:*

Be it known that I, JOSEPH CLAYTON, a citizen of the United States, residing at city, county, and State of New York, have invented a new and useful Improvement in Take-Up Mechanisms for Winding Devices, of which the following is a specification.

This invention relates to improvements in winding mechanisms, and is more especially directed to a compensating or take-up mechanism, the speed of which is controlled by the weight of the material supported by the reel, drum or other winding element.

As is well known, in a motion picture projection machine a film emerges at a uniform rate, but the diameter of the film on the receiving or take-up reel increases as more and more of the film is wound onto it. Therefore, the speed of rotation of said reel must vary according to the amount of film wound thereon. In this operation the tension upon the film must not be so great as to exert a pull thereupon which will injure or break the sprocket holes adjacent to its edges, but at the same time the film must be positively taken up or it will accumulate in the magazine in an unwound condition and cause a jam, resulting in the injury or breakage of the film.

The present forms of take-up mechanisms employ a friction clutch adapted to be set with a fixed degree of driving connection, which does not vary with the amount or weight of film wound. The tension is usually obtained by means of a helical spring, springs of different degrees of tension being employed for use in the take-up of films of different lengths. While this form of structure may be used without tensioning the film over much, naturally the tension will lessen as the film is wound, on account of the added force needed to rotate the film as its windings increase and the load imposed upon the take-up becomes greater.

Broadly, the present invention is directed to a take-up which obviates the necessity of setting the mechanism for the amount of film to be wound and functions so as to give substantially the same amount of take-up pull irrespective of the amount of the film wound. While, for the purpose of this disclosure, I have elected to illustrate and describe my invention as used in conjunction with a machine for projecting moving pictures, I would have it understood that my invention may be employed with equal satisfaction in conjunction with winding mechanisms in other arts.

One of the objects of this invention is to provide a take-up mechanism adapted to receive power from a substantially constant source whereby the resistance to rotation of the winding element by the weight of the material wound is compensated for by a corresponding increase in the power transmitted from the source to the winding element.

Another object of the invention is to provide a winding mechanism which is adapted to maintain a substantially constant and even pull upon the material taken up.

A further object of the invention is to provide winding mechanism which is automatically responsive to the weight of the material supported to maintain an even tensioning of the material being wound, and a mechanism which is simple and durable in construction and adapted to be used for winding films in motion picture machines, cloth or ribbons on fabric making machines or the like.

My invention further contemplates a take-up mechanism of the character described which may be readily incorporated in machines or structures of existing types without changing their construction, whereby my improved take-up may be readily substituted for the present forms of take-up mechanisms, heretofore described, in a simple and expeditious manner.

Other objects and advantages of my invention will become manifest as the description proceeds and I will have it understood that I reserve unto myself all rights to the full range of equivalents both to the structures and uses to which I may be entitled under my invention in its broadest aspect.

I shall now proceed to describe my invention with reference to the specific embodiment therein shown and then point out with more particularity the essential features and novelty residing therein in the appended claims.

In the accompanying drawings:

Figure 1 is a diagrammatic representation of a motion picture projector and lamp showing the take-up mechanism in position on the lower magazine.

Fig. 2 is a sectional view of the take-up mechanism mounted on the lower magazine of a motion picture projector, and includes the lower reel and a portion of the film.

Fig. 3 is a perspective view of certain parts of the take-up mechanism, separated, a portion of the take-up shaft being broken away.

Fig. 4 is another sectional view of the take-up mechanism.

Similar reference characters refer to similar parts throughout the several views in the drawings, and in which:—

1 represents a motion picture projection machine, 2 the lamp, and 3 the lower magazine, adapted to contain the lower or receiving reel 4 upon which the film 5 is adapted to be wound at a constant speed. 6 indicates the take-up mechanism whereby reel 4 is rotated to effect the proper winding of film 5 thereon.

As shown in the drawings, the take-up mechanism comprises a shaft 7 adapted to carry and rotate reel 4.

Shaft 7 is loosely mounted for rotation in a sleeve 8 fastened internally as by set screw 10 to another sleeve or hub 9 mounted on or integral with magazine 3.

A source of power is supplied and is shown to comprise pulley 11 adapted to be rotated by belt 12 connected in the usual way with the mechanism for driving the projector. A frictional clutch mechanism is supplied whereby power may be transmitted in varying degrees from driving member 11 to take-up shaft 7 and is adapted to be responsive to the weight of the material taken up or supported by shaft 7, so that the amount of positive driving connection between the source of power and the shaft 7 will increase with the weight of the material supported by the take-up shaft to compensate for the resistance offered to the rotation of shaft 7 by the weight of that material and thus maintain a substantially even and constant tensioning of the material taken up.

The clutch mechanism comprises a disk like surface 13 mounted on or integral with pulley 11, a disk 14 mounted for rotation on shaft 7, and a third disk 15 having a circular flange 16 recessed as at 17 adapted to engage a pin 18 piercing shaft 7, which pin may also pierce a perforated tapered member 19 fixed to shaft 7 and adapted to support disk 15.

Another tapered member 20 is fixed about shaft 7 as by set screw 21, the tapered surface of this member being adapted to loosely engage a complemental surface 22 formed in the hub 9 carried on magazine 3; members 19 and 20 being so positioned that shaft 7 may be moved within limits transversely of the plane of rotation of pulley 11. When the shaft is moved to the left, disks 13, 14 and 15 will be urged into closer contact, thereby increasing the positive driving connection between pulley 11 and shaft 7, and when shaft 7 is moved toward the right the amount of this positive driving connection is accordingly decreased.

Added weight to the supporting end of shaft 7, as when material is being taken up, will urge shaft 7 to move toward the left by reason of gravity causing tapered surface of member 20 to slide outward on surface 22 and this force will tend to increase with the weight of the material taken up. Thus the positive driving connection effects will be determined by the weight of the wound material. By appropriate adjustments of members 19 and 20 the mechanism may be made to be properly responsive to the nature of the material to be wound and to automatically effect for any given material a substantially constant and even tensioning of the material to be taken up.

If desired the sleeve 8 may be of a length to extend through and lie in the plane of the inner face of the bracket 3. Under such circumstances it will be unnecessary to provide the chamfered or beveled surface 22 on said bracket, the bearing surface similar thereto, and which is complemental to the tapered portion 20ª of the member 20, being formed in the sleeve itself. Obviously by this arrangement the attachment of my mechanism to existing types of machines is greatly simplified.

Clutch members 13, 14 and 15 may comprise any one of a number of combinations of materials, one satisfactory combination being steel for members 13 and 15, and brass for member 14.

While I have described my invention with reference to the specific structure illustrated, it is obvious that various changes in the details and arrangement of the components thereof may be made without departing from the spirit or scope of my invention.

What I claim is:

1. In a take-up mechanism for winding material, a shaft having a winding element mounted to rotate therewith, means for driving said shaft, a clutch mechanism for connecting said driving means to said shaft, and means carried by said shaft to permit of the longitudinal movement thereof during the winding operation whereby the peripheral speed of the material being wound will be controlled by the weight thereof.

2. In a take-up mechanism for winding material, a shaft adapted to receive a winding element to rotate therewith, a yieldable drive for said shaft, and means responsive to the weight of the material wound on said winding element to permit of the longitudinal movement of said shaft during the winding operation whereby the torque transmitted to said shaft will vary proportionately with the weight of the material carried by said winding element to obtain a uniform peripheral speed of the material being wound.

3. In a device of the character described, in combination, a rotatable driving member, a rotatable take-up shaft adapted to support material taken up and to move transversely of the plane of rotation of said driving member, means whereby variation in the weight of material supported by said shaft causes corresponding transverse movement of said take-up shaft, and means comprising a clutch mechanism responsive to transverse movement of said take-up shaft operatively connecting said driving member with said take-up shaft and effecting a driving connection therebetween variable in response to transverse movement of said take-up shaft, said means coöperating to automatically maintain an even pull upon the material to be taken up.

4. In a take-up mechanism, the combination of a support, a sleeve mounted therein and extending therebeyond, a shaft mounted for rotatable and longitudinal movement within said sleeve, a second sleeve rotatably mounted upon said first sleeve embodying a pulley clutch member, and a second clutch member rotatable with said shaft and formed to coöperate with the said first clutch member to control the speed of rotation of said shaft under certain predetermined conditions; and a winding element mounted on said shaft.

5. In a take-up mechanism, the combination of a support, a shaft mounted for rotation therewithin, a clutch mechanism embodying a pulley carried by said support, means for connecting said shaft to one of the elements of said clutch mechanism to rotate therewith, and a tapered member carried by said shaft and adapted to coöperate with said support in a manner whereby said shaft will be capable of longitudinal movement under certain predetermined conditions.

6. The combination with a winding mechanism of a take-up device, comprising a shaft adapted to support the winding element, driving means, a clutch mechanism interposed between said driving means and said shaft, and means for permitting a longitudinal movement of said shaft as the load upon the winding element increases to function the clutch mechanism in a manner whereby the winding element will take-up the material being wound with an even tension, irrespective of the amount of material on said element.

7. In a winding mechanism, a shaft, means for driving said shaft having a winding element keyed thereto, a clutch mechanism interposed between said driving means and said shaft, whereby rotary power is delivered to said shaft, and means to permit of the movement of said shaft in a longitudinal direction during its rotation, the functioning of said means being controlled by the weight of material carried by said winding element.

8. In a winding mechanism element, a rotatable shaft, means for driving said shaft carrying a winding element, and means for permitting a longitudinal movement of said shaft during rotation, the functioning of said means being controlled by the weight of material carried by said winding element.

9. In a winding mechanism, the combination of a shaft, a winding element keyed thereto, a yieldable drive for said shaft, and means for permitting said shaft to move longitudinally while rotating, said means being controlled by the weight of material wound upon said winding element, whereby the material is maintained at an even tension throughout the winding operation.

10. In a winding mechanism, the combination of a shaft, a winding element keyed thereto, driving means for said shaft, a yieldable connection between said driving means and said shaft, and means carried by said shaft to permit of a longitudinal movement thereof relatively to said yieldable connection to vary the rotative force delivered to said shaft from said driving means, the longitudinal movement of said shaft being controlled by the weight of the material wound upon said winding element, whereby an even pull will be exerted upon the material taken up throughout the winding operation.

JOSEPH CLAYTON.